Feb. 7, 1967 H. ENDRES ET AL 3,303,484

METHOD AND APPARATUS FOR OPTIONALLY WRITING-IN AND READING-OUT VARIABLE LENGTH INFORMATION BLOCKS IN CIRCULATING MEMORIES

Filed Oct. 23, 1962 6 Sheets-Sheet 1

INVENTORS.
HERMANN ENDRES
HEINRICH BÖHME
GERHARD JUNG
BY
Percy P. Lantzy
ATTORNEY Feb. 7, 1967 H. ENDRES ET AL 3,303,484

METHOD AND APPARATUS FOR OPTIONALLY WRITING-IN AND READING-OUT VARIABLE LENGTH INFORMATION BLOCKS IN CIRCULATING MEMORIES

Filed Oct. 23, 1962 6 Sheets-Sheet 2

INVENTORS.
HERMANN ENDRES
HEINRICH BÖHME
BY GERHARD JUNG

ATTORNEY

METHOD AND APPARATUS FOR OPTIONALLY WRITING-IN AND READING-OUT VARIABLE LENGTH INFORMATION BLOCKS IN CIRCULATING MEMORIES

Filed Oct. 23, 1962 6 Sheets-Sheet 3

INVENTORS.
HERMANN ENDRES
HEINRICH BÖHME
GERHARD JUNG
BY
[signature]
ATTORNEY

INVENTORS.
HERMANN ENDRES
HEINRICH BÖHME
GERHARD JUNG
BY Percy P. Lantzy
ATTORNEY

INVENTORS.
HERMANN ENDRES
HEINRICH BÖHME
GERHARD JUNG
BY
ATTORNEY

INVENTORS.
HERMANN ENDRES
HEINRICH BÖHME
GERHARD JUNG
BY
ATTORNEY 3,303,484
Patented Feb. 7, 1967

3,303,484

METHOD AND APPARATUS FOR OPTIONALLY WRITING-IN AND READING-OUT VARIABLE LENGTH INFORMATION BLOCKS IN CIRCULATING MEMORIES

Hermann Endres, Stuttgart-Muhlhausen, Heinrich Böhme, Stuttgart-Weilimdorf, and Gerhard Jung, Stuttgart-Stammheim, Germany, assignors to International Standard Electric Corporation, New York, N.Y., a corporation of Delaware Filed Oct. 23, 1962, Ser. No. 232,370
Claims priority, application Germany, Oct. 24, 1961, St 18,467
4 Claims. (Cl. 340—174.1)

Figure 1:
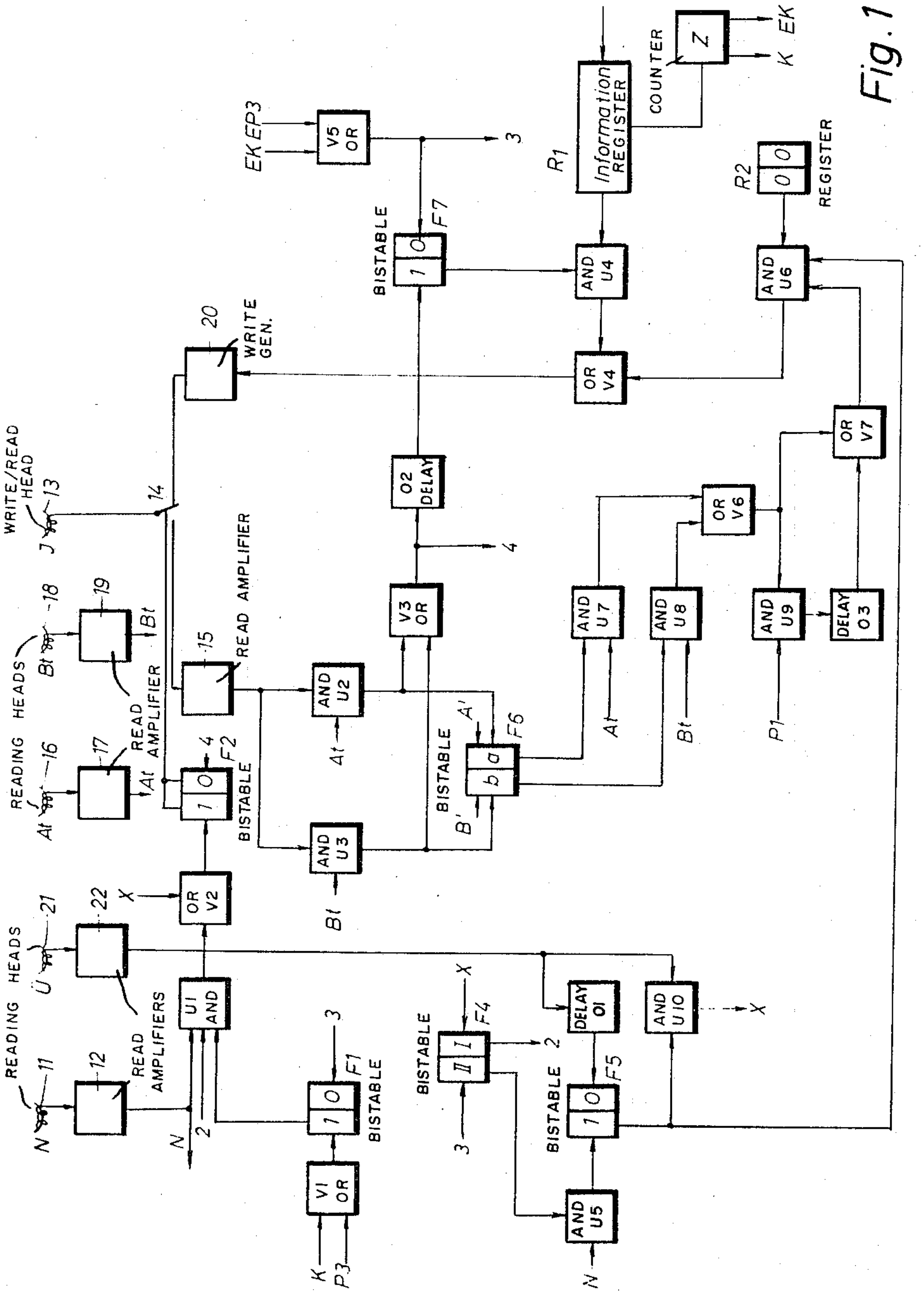

The invention relates to a method and apparatus for optionally writing-in and reading-out blocks of information, each block consisting of a variable number of characters of equal bit length, into or out of circulating memories, particularly magnetic drums, which are used to provide buffer storage between rapid data-processing systems and slow feed-in and read-out devices, this permitting block transfers between the rapid system and the buffer storage, and character-by-character transfers between the buffer storage and the slow feed-in/read-out devices, using only one combined write/read head per storage track.

In general, addresses are associated with the information stored in a magnetic drum to permit convenient access to any information storage position. In certain applications, however, it is necessary to so control the writing or reading process that the information in the sequence of its arrival is written into successive storage cells and later read out in the same sequence. For this, address interrogating and/or addressing is very expensive, particularly so if the word or block length of the stored information is variable. To avoid address interrogation, the storage cells holding information may be marked with a "busy" indication, and those holding no information may be marked with an "idle" indication. In memories so marked, it is necessary to scan the busy and idle indications at high speed, e.g. in writing information it is necessary to read the first idle indication, to store the information in the corresponding information storage cells, and to convert the first idle indication into a busy one. This poses a difficult problem because, during reading and evaluation of the first available idle indication, a certain finite time elapses during which the memory is moved on so that a converting pulse from idle to busy could not then reach the storage cell containing the first idle indication.

To avoid these difficulties the previous practice has been to use two heads per drum track, separated by a given distance. For this to be effective, the reading and writing operations must be independently timed. Conversion of an idle indication into a busy one then requires two steps; namely the read-out of the idle indication by one of the heads in a first step and, in a second step, the writing-in of the busy indication by means of the other head, after the necessary time interval, required for evaluating the read-out indication and for initiating the write-in process, has elapsed. The track space between the two heads must therefore be such that an indication storage cell, the marking of which is to be converted from idle to busy, will have been precisely moved, during the said necessary interval, from the one to the other head. The disadvantage of this technique is evident. Care must be taken to ensure that the time interval between read and write, as mentioned above, shall not change e.g. due to aging of the read-out evaluating device, that the motion speed of the drum is kept precisely constant and, finally, that the manufacture and adjustment of the two heads are confined to very precise tolerance limits, so that the prescribed track space between the two heads is precisely established.

It has been proposed, in order to avoid these disadvantages, to provide two marking tracks, for association with a larger number of information tracks, by means of which the idle or busy conditions of the individual storage cells on the information tracks can be marked, a combined writing and reading head being associated with each marking track.

The marking procedure, in this instance, is so arranged that with each new interrogation or writing operation alternately the new marking indication is written-in on one track, and on the other marking track an indication of the change in the kind of marking indication is written-in. Such an arrangement is very advantageous if all of the information tracks are operated upon in parallel. If, however, the circulating memory is required to serve as a buffer storage between a high speed electronic system and a large number of independent slow speed write and read devices, to each of which one information track on the drum is permanently associated, as is required in the usual storé-and-forward serial operation, two marking tracks would be required for each information track. But this leads to an uneconomical use of available storage space. Besides, it is required in many instances to use the same drum system for rapid block transfers of information during a single drum rotation, or for character-by-character "slow" transfers, between the drum and the more slowly operating input and output devices, involving one or several drum rotations between successive character transfers. Finally, it may be required to slowly read out, character-by-character, information which was previously written in a block transfer, before further storage processes on the information can be performed. Care must then be taken to ensure that characters are not read twice. For the above-descirbed buffer storage it is not feasible to read out information character by character if it has previously been written in a block transfer.

To avoid the disadvantages and to meet the requirements mentioned above, we have devised an arrangement which serves to transfer information items into and out of a magnetic drum memory system, either in the form of a block transfer of information between a storage track of the drum and a rapid data-processing system, or in the form of a character-by-character transfer between the drum and a more slowly operating input or output device, using a single combined read/write head per track. According to the invention, writing and reading are effected in relation to at least two groups A and B, into which the storage cells of a defined track length are divided, the storage cells of these groups being interlaced in a predetermined sequence such that, during one or more drum rotations, two digit control signal storage spaces iindividually associated to the group cells can be easily marked so as to distinguish the idle cells from the busy ones, and to distinguish a block transfer from a character-by-character transfer. Depending on the group assigned to each storage cell into, or out of, which an information item, or the first information item of a block, is to be respectively written or read, the control signals are changed in such a way that the drum condition is the same after a character-by-character reading as after a character-by-character writing, and such that a character-by-character reading operation can only be performed on information previously written in a block transfer.

Selection of the control characters to mark the idle or busy storage cells is arbitrary, but it must be such that only after a block-wise writing can the corresponding storage cells be read out character-by-character, so that information items written-in character-by-character cannot be read out in the same maner, and the selection must further be such that information items previously read-out character-by-character cannot be read out in this way a second time. The control character "00" may be used to mark the first idle storage cell; in that case all first digits of the control characters may be checked in a first drum rotation to ascertain whether a "0" or "1" is present. After the first "0" is located the information is immediately read from or written into the following information storage cell during the same rotation, and the group containing the first '0' control character is noted. Then, in a subsequent drum rotation the first digits of all control characters of the other group are read, and upon each detection of a "1," "1" will be writ-

*Drum seam*

Table I shows a section of a drum track in the basic initial condition for transferring information according to the first method. It may be assumed for purposes of explanation, that each information character contains five bits suitable to represent teletype characters, and that each storage cell includes a five bit information character position and a two bit control character position. The drum seam or drum revolution reference mark is represented by the left vertical line and the storage cells are alternately associated to the two control groups A and B.

In the initial condition, except for the first control character, the entire track is in the 0 state; the control marking 11 in any control bit position indicates the end of the information already on the drum track and the beginning of the still available part of the drum track (i.e. the control character 11 identifies the first idle storage cell).

TABLE II

| Number of Characters | Drum Rotation | A | | B | | A | | B | | A | |
|---|---|---|---|---|---|---|---|---|---|---|---|
| Initial Condition | ---------- | 11 | 00000 | 00 | 00000 | 00 | 00000 | 00 | 00000 | 00 | 0 . . . |
| 1 | 1 | 11 | xxxxx | 11 | 00000 | 00 | 00000 | 00 | 0000 | 00 | 0 . . . |
| | 2 | 00 | xxxxx | 11 | 00000 | 00 | 00000 | 00 | 00000 | 00 | 0 . . . |
| 2 | 1 | 00 | xxxxx | 11 | xxxxx | 11 | 00000 | 00 | 00000 | 00 | 0 . . . |
| | 2 | 00 | xxxxx | 00 | xxxxx | 11 | 00000 | 00 | 00000 | 00 | 0 . . . |
| 3 | 1 | 00 | xxxxx | 00 | xxxxx | 11 | xxxxx | 11 | 00000 | 00 | 0 . . . |
| | 2 | 00 | xxxxx | 00 | xxxxx | 00 | xxxxx | 11 | 00000 | 00 | 0 . . . |
| 4 and last | 1 | 00 | xxxxx | 00 | xxxxx | 00 | xxxxx | 11 | xxxxx | 11 | 0 . . . |
| | 2 | 00 | xxxxx | 00 | xxxxx | 00 | xxxxx | 00 | xxxxx | 11 | 0 . . . |

x (single underline) denotes "read x."

x (double underline) denotes "write x."

ten-in at the first bit position of the following control character.

Another possibility is to use the control character "11" to indicate a transition from a busy to an idle storage cell condition, to check all first control character positions in a first drum rotation for a "0" or "1," to write-in the information after a "1" has been found, simultaneously noting the group to which the corresponding storage cell belongs, and then to write-in the control character "11" at the next idle storage cell control character position. Then, all second positions of the control characters may be checked for a "0" or "1" for a character-by-character reading, simultaneously noting in which group the "1" is found, and entering a "1" at the second position of the following control character. In a second drum rotation, in case of character-by-character writing, "00" will be entered in all control characters of the noted group, and in a character-by-character reading a "0" will be entered at the second bit position of the control characters of the noted group. Finally in case of block-wise writing a "0" will be entered at the first bit positions of all control characters of the noted group.

The principal mode of operation of both methods and the apparatus associated therewith is more fully explained in connection with the Tables I to VIII, below.

TABLE I

| A | | B | | A | | B | | A | |
|---|---|---|---|---|---|---|---|---|---|
| 11 | 00000 Inf. | 00 | 00000 Inf. | 00 | 00000 Inf. | 00 | 00000 | 00 | 000 . . . |

*Character-by-character writing on the information track (Table II)*

Table II indicates the condition of an information track during the successive writing of individual characters. For entering a character two drum rotations are required as indicated by the horizontal division. Reading is denoted by a single line and writing by a double line underneath the corresponding storage bit indication. Since the information bits may be arbitrarily 0 or 1, an arbitrary indication $x$ is entered in each information bit position.

Writing of individual information characters is accomplished as follows: Starting at the drum seam, the first control bit of each characters is checked for 0 or 1. When a 1 is found the five information bits are written-in, after a delay of one bit position, this affording time to switch over the writing/reading head from reading to writing condition before it reaches any of the following five information bit positions, and immediately thereafter the transfer character 11 is written-in at the two control bit positions of the following character storage cell . At the same time, the A or B group associated to the storage cell which received the information character is noted. In the present example, the first and third characters are written-in at group A and the second and fourth characters at group B.

During the second drum rotation all control characters of the noted group are set to 00. Thus the transfer marking is advanced by one storage cell position, thereby again indicating the first idle storage cell space of the drum track.

TABLE III

| Rotation | A | | B | | A | | B | | |
|---|---|---|---|---|---|---|---|---|---|
| Initial Condition | 11 | 00000 | 00 | 00000 | 00 | 00000 | 00 | 00000 | 00.... |
| 1 | 11 | xxxxx | 00 | xxxxx | 00 | xxxxx | 11 | 00000 | 00.... |
| 2 | 01 | xxxxx | 00 | xxxxx | 00 | xxxxx | 11 | 00000 | 00.... |

*Blockwise writing of information items (Table III)*

To transfer a complete information block from a data-processing system onto the drum track, the first control bits of each character are read until a "1" is found. Thereupon as indicated in Table III above, after a delay of one bit position, the entire block of information and the end of transfer marking "11" are written-in. Then, depending on whether the information transfer started at an A or B cell, all first control bits of that group will be set to 0, during the next drum rotation. To prevent setting of a 0 in the control bit position marking the end of the information, the number of characters in the transferred block must in principle be odd, so that to a block containing an even number of characters an additional character must be added prior to writing.

After completion of the block transfer, the start of the written-in information is marked by 01 (in contrast to 00 for the information inserted character-by-character, as in Table II) and the end of the information is indicated by 11.

one storage bit position to allow time to switch-over the read/write head from reading to writing, a 1 is written in the second control bit position of the following character cell. During the following drum rotation all second control bits in the noted group are set to 0 so that the 01-marking has been effectively advanced by one cell position.

The transfer is terminated when, prior to sensing of a 1 in the second control bit position, a 1 is found in the adjacent first control bit position.

In a block transfer from the drum to a data-processing system, starting at the drum seam, the entire information including the control bits is read out until a 1 is found in a first control bit position, the control bits being suitably suppressed from the transferred block. The contents of the drum track need not be changed during this procedure.

TABLE IV

| Number of Characters | Rotation | A | | B | | A | | B | |
|---|---|---|---|---|---|---|---|---|---|
| Initial Condition | | 01 | xxxxx | 00 | xxxxx | 00 | xxxxx | 11 | 00000... |
| 1 | 1 | 01 | xxxxx | 01 | xxxxx | 00 | xxxxx | 11 | 00000... |
| | 2 | 00 | xxxxx | 01 | xxxxx | 00 | xxxxx | 11 | 00...... |
| 2 | 1 | 00 | xxxxx | 01 | xxxxx | 01 | xxxxx | 11 | 00...... |
| | 2 | 00 | xxxxx | 00 | xxxxx | 01 | xxxxx | 10 | 00...... |
| 3 | 1 | 00 | xxxxx | 00 | xxxxx | 01 | xxxxx | 11 | 00...... |
| | 2 | 00 | xxxxx | 00 | xxxxx | 00 | xxxxx | 11 | 00...... |
| End | 1 | 00 | xxxxx | 00 | xxxxx | 00 | xxxxx | 11 | 00...... |

*Character-by-character reading of the information track (Table IV)*

In a character-by-character transfer of information from the magnetic drum to a read-out device, starting at the drum seam the first 1-marking in the second bit position of a control character is located and immediately thereafter the following five-bit information character is read from the drum track. At the same time, it is noted whether the cell being read out is in group A or B, e.g. whether the next character is in group B or A. After reading of the information character and after a delay of

TABLE V

Drum Seam

| A | | B | | A | | B | |
|---|---|---|---|---|---|---|---|
| 00 | 00000 Inf. | 00 | 00000 Inf. | 00 | 00000 Inf. | 00 | 00000 |

*Basic condition*

Table V shows the basic initial condition of the drum track for transfers according to the second method. Here the entire track is initially set to 0.

TABLE VI

| Number of Characters | Rotation | A | | B | | A | | B | | A | |
|---|---|---|---|---|---|---|---|---|---|---|---|
| Initial Condition | | 00 | 00000 | 00 | 00000 | 00 | 00000 | 00 | 00000 | 00 | 0... |
| 1 | 1 | 00 | xxxxx | 00 | 00000 | 00 | 00000 | 00 | 00000 | 00 | 0... |
| | 2 | 10 | xxxxx | 00 | 00000 | 00 | 00000 | 00 | 00000 | 00 | 0... |
| 2 | 1 | 10 | xxxxx | 00 | xxxxx | 00 | 00000 | 00 | 00000 | 00 | 0... |
| | 2 | 10 | xxxxx | 10 | xxxxx | 00 | 00000 | 00 | 00000 | 00 | 0... |
| 3 | 1 | 10 | xxxxx | 10 | xxxxx | 00 | xxxxx | 00 | 00000 | 00 | 0... |
| | 2 | 10 | xxxxx | 10 | xxxxx | 10 | xxxxx | 00 | 00000 | 00 | 0... |
| 4 and last | 1 | 10 | xxxxx | 10 | xxxxx | 10 | xxxxx | 00 | xxxxx | 00 | 0... |
| | 2 | 10 | xxxxx | 10 | xxxxx | 10 | xxxxx | 10 | xxxxx | 00 | 0... |

*Character-by-character writing on the information track (Table VI)*

For a character-by-character transfer of information the first control character bits, starting at the drum seam, are checked for a 0 or 1. After the first 0 is found and after a delay of one storage cell bit position allowing time to switch over from reading to writing, the information is written into the following five storage cells, it being simultaneously noted whether a group A or B cell is being filled. Assume, for example, that an A cell is being filled. During the following drum rotation alternately, a 1 is written into the first control bit position of an A cell and the first control bit position of the next B cell is read out, until a 0 is read out. For switching the read/write head from reading to writing and vice versa a six bit time interval between storage cells is available during the second revolution.

After the writing-in is completed each occupied cell contains a 1 in the first control bit position.

ing system starting at the drum seam, the entire information including the control bit is read to the end of the information. In a suitable converter the control bits are then suppressed. The contents of the drum track need not thereby be changed.

As may be gathered from the above tables after a transfer of information from the data-processing system to the buffer storage, i.e. the magnetic drum, the information is first transferred to the input-output-device character by character before a new information can be written on the same drum track. This process is controlled by the input-output-device associated to the track, which device through-connects the transfer path from the slow-operating in-output device via the buffer storage to the data-processing system. Operation of the slow-acting device means for the task here an interrogation to the data-processing system which is answered in the reverse sequence. The respective drum track is available again only then, when the exchange of information is completed in both directions. Since in our case here only one input device

TABLE VII

| | A | | B | | A | | B | | A | |
|---|---|---|---|---|---|---|---|---|---|---|
| Initial Condition | 00 | 00000 | 00 | 00000 | 00 | 00000 | 00 | 00000 | 00 | 0 . . . |
| | 00 | xxxxx | 00 | xxxxx | 00 | xxxxx | 00 | xxxxx | 00 | 0 . . . |

*Block-wise writing on the information track (Table VII)*

In order to transfer a complete information block from a data-processing system to the drum track, the first control bits are read until a 0 is found. Thereupon after a one bit delay to switch-over from reading to writing, the entire information block is written. No second drum rotation is necessary in this transfer, because the control bits remain unchanged. However, in contrast to the first method, it is noted that only one block can be written on one track.

is used for one drum track, the input device can interrogate again only when the preceding interrogation was answered.

The condition of the drum track after the character-by-character reading is the same as for the character-by-character writing, in order to guarantee that the entire information block can be returned to the data-processing system, in case of a failure on the transfer path to the output-device or in the output-device itself, and reissued through another channel.

TABLE VIII

| Number of Characters | Rotation | A | | B | | A | | B | | A | |
|---|---|---|---|---|---|---|---|---|---|---|---|
| Initial Condition | ---------- | 00 | xxxxx | 00 | xxxxx | 00 | xxxxx | 00 | 00000 | 00 | 0 . . . |
| 1 | 1 | 00 | xxxxx | 00 | xxxxx | 00 | xxxxx | 00 | 00000 | 00 | 0 . . . |
| | 2 | 10 | xxxxx | 00 | xxxxx | 00 | xxxxx | 00 | 00000 | 00 | 0 . . . |
| 2 | 1 | 10 | xxxxx | 00 | xxxxx | 00 | xxxxx | 00 | 00000 | 00 | 0 . . . |
| | 2 | 10 | xxxxx | 10 | xxxxx | 00 | xxxxx | 00 | 00000 | 00 | 0 . . . |
| 3 | 1 | 10 | xxxxx | 10 | xxxxx | 00 | xxxxx | 00 | 00000 | 00 | 0 . . . |
| | 2 | 10 | xxxxx | 10 | xxxxx | 10 | xxxxx | 00 | 00000 | 00 | 0 . . . |
| End | 1 | 10 | xxxxx | 10 | xxxxx | 10 | xxxxx | 00 | 00000 | 00 | 0 . . . |

*Character-by-character reading of the information track (Table VIII)*

In a character-by-character transfer from the magnetic drum to an output device that first 0-marking in the first control bit of a character, is located, starting at the drum seam, and then the following five information bits are read from the drum track. At the same time it is determined whether this was done at a group A or B location. During the next drum rotation first control bits in group B or A, respectively, are read and 1's are entered in the group A or B first control bit positions until a 0 control bit is read. This is the same process as described above with reference to Table 6, for a character-by-character transfer onto the magnetic drum.

The transfer is terminated when an empty information cell is read out. At the end, each cell, the information content of which has already been transferred, is set to 1 in the first control bit position.

In a block transfer from the drum to the data-process-

Figure 2:
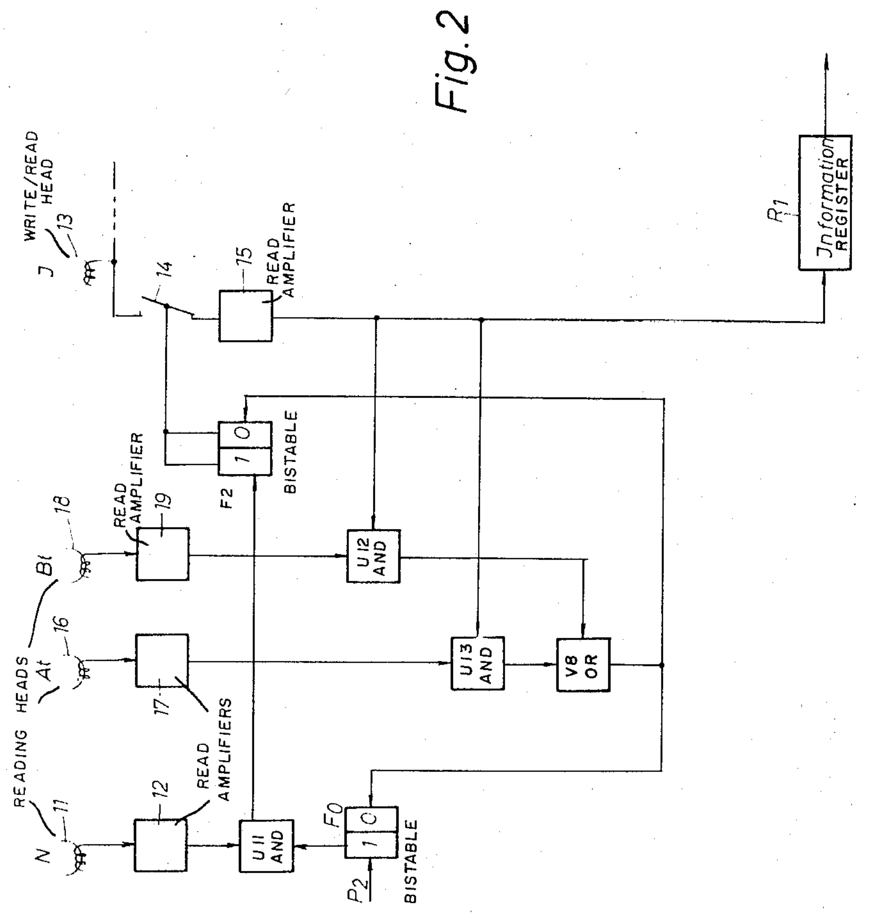
Figure 3:
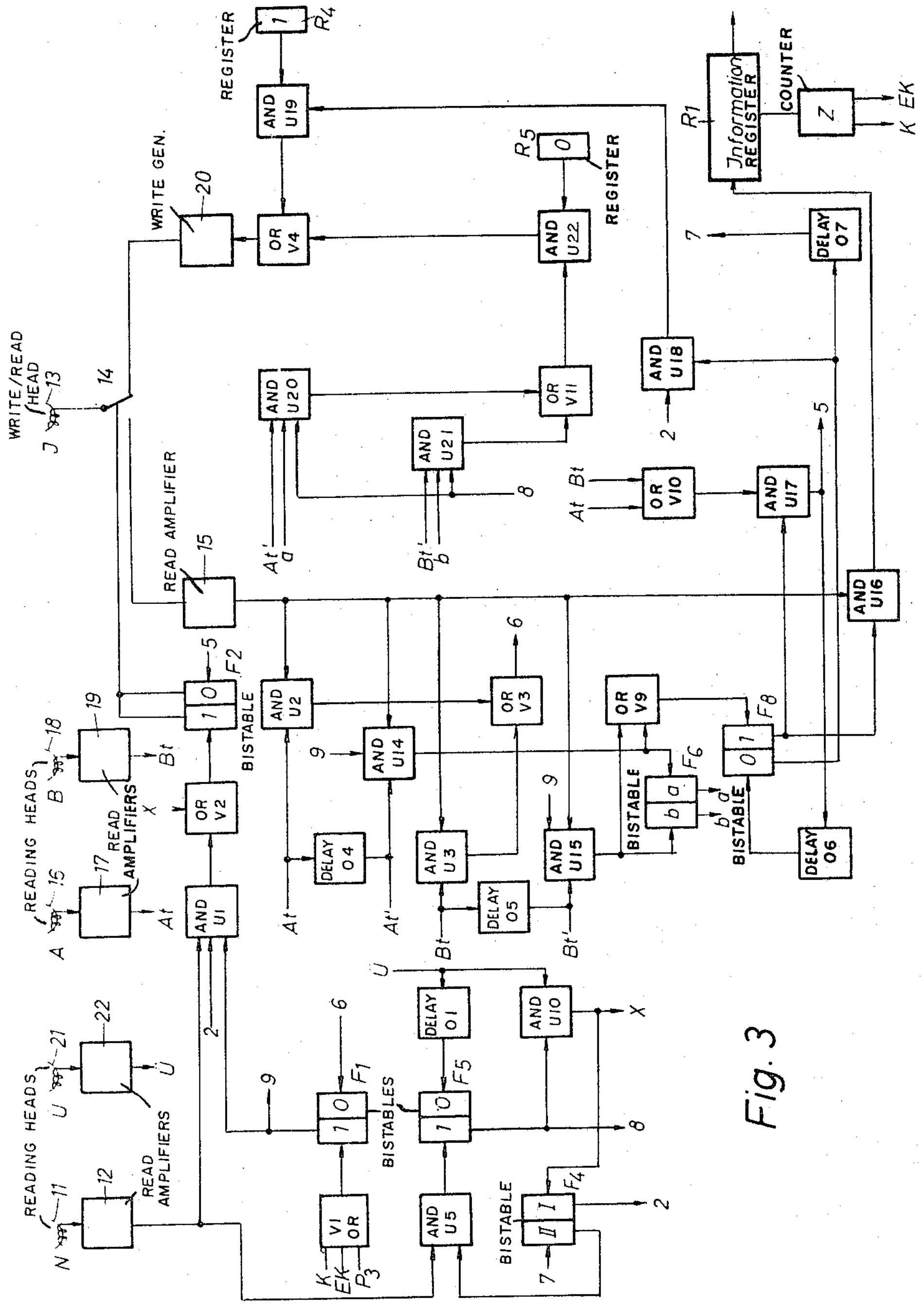
Figure 4:
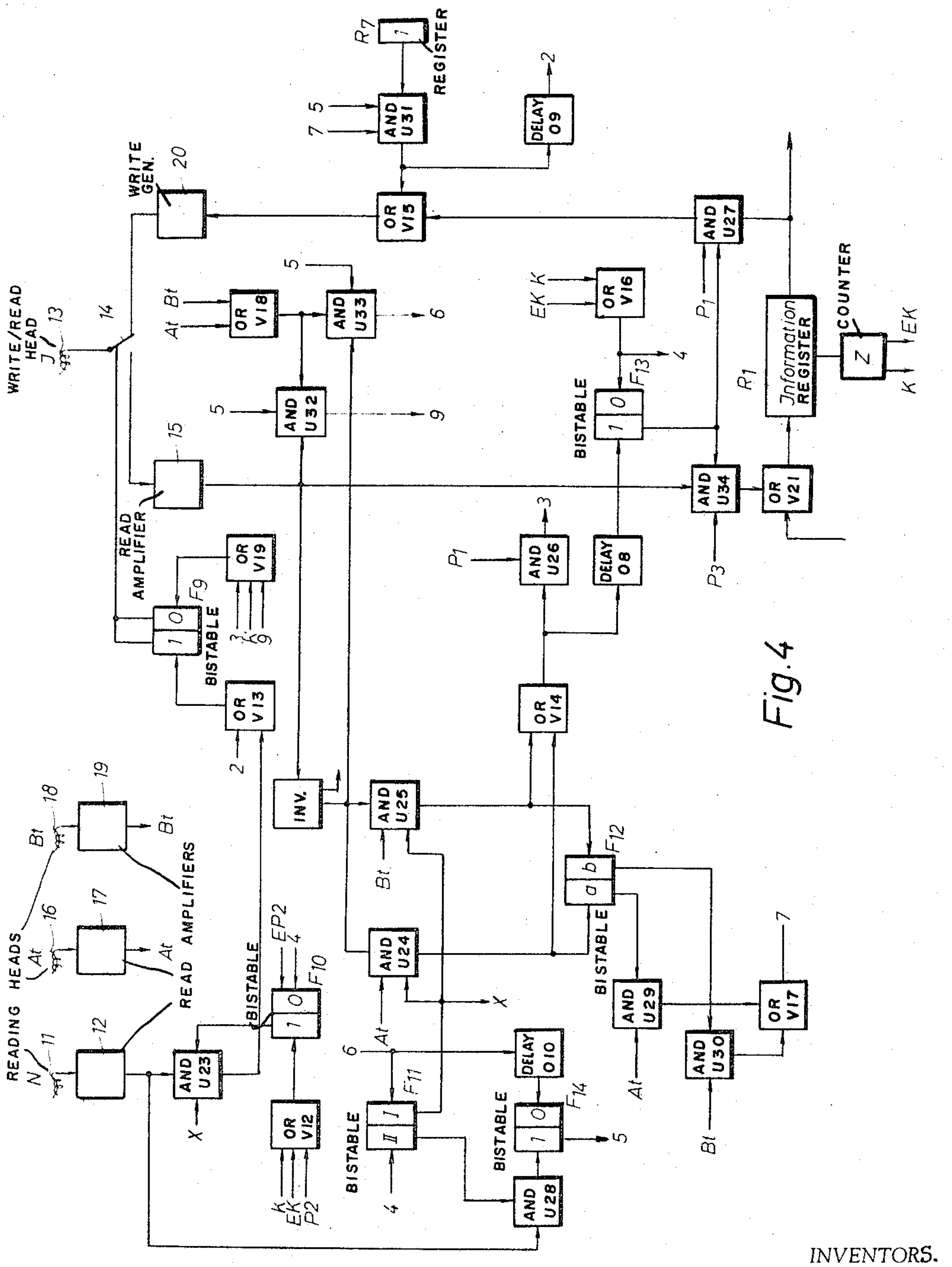
Figure 5:
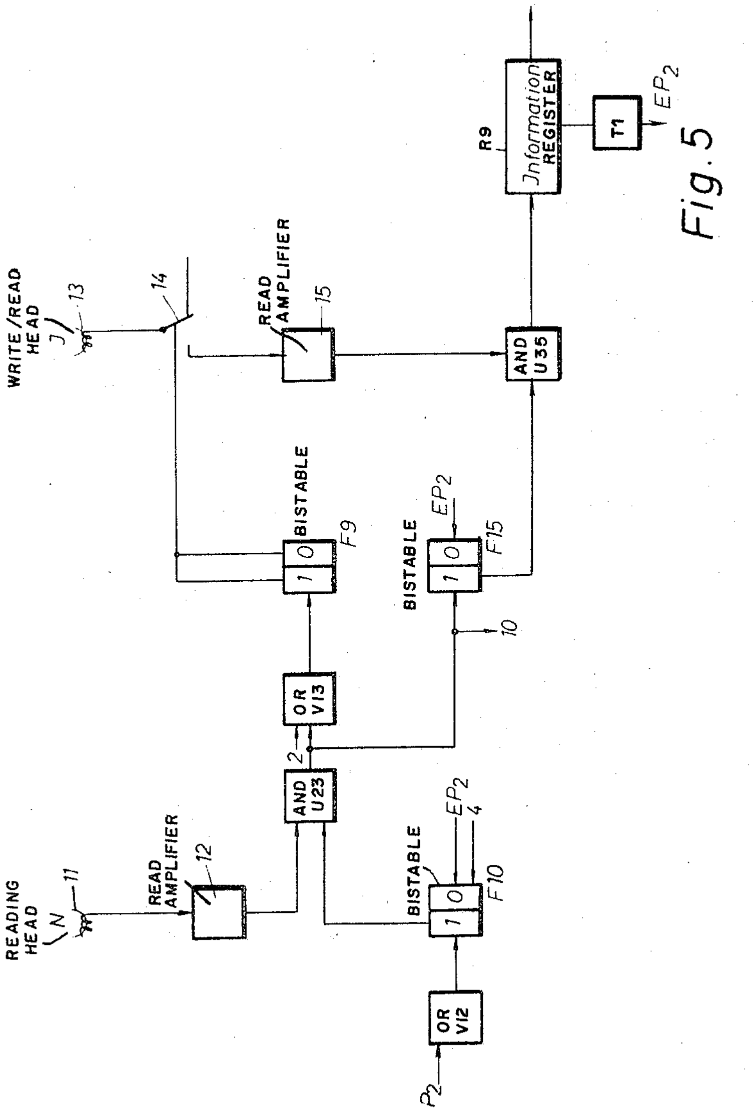
Figure 6:
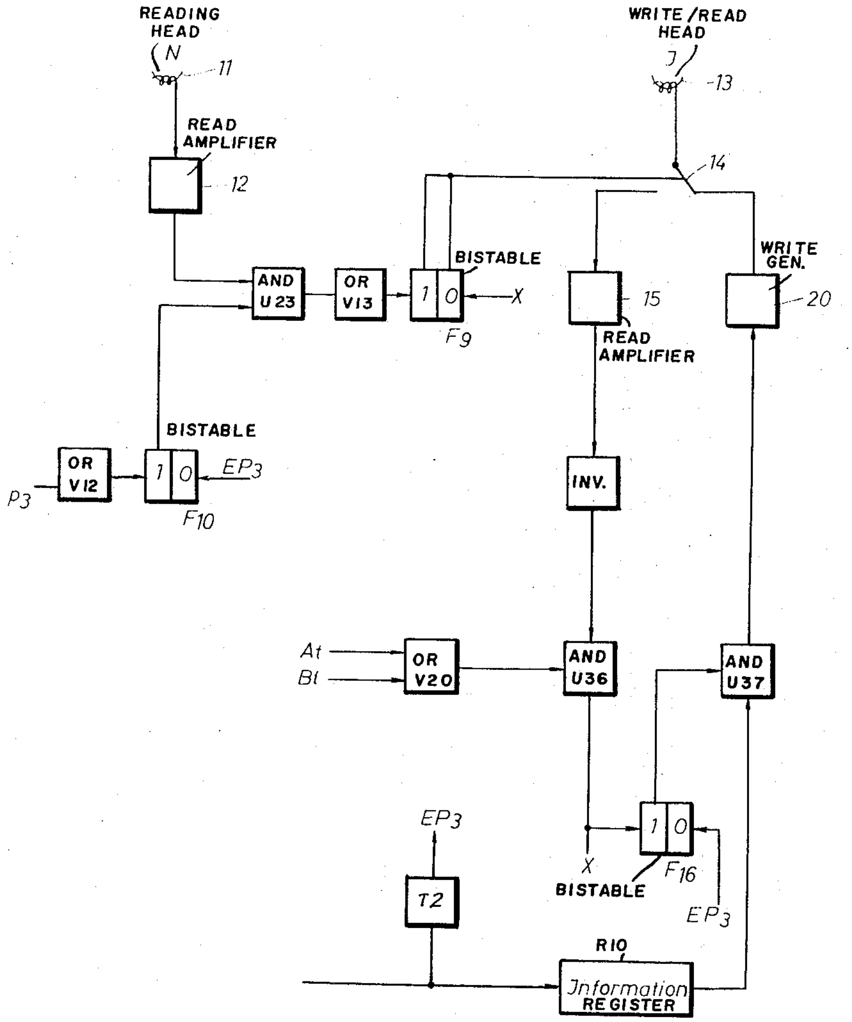

The two methods described above are more specifically explained in connection with the associated logic circuits therefor as shown in FIGS. 1–6 below wherein:

FIG. 1 is a drawing of a schematic circuit arrangement for character-by-character and block-wise writing on a drum information track according to the first method, FIG. 2 is a drawing of a circuit arrangement for block-wise reading out of an information track according to the first method, FIG. 3 is a block diagram of an arrangement for character-by-character reading-out of an information track according to the first method, FIG. 4 is a block diagram of an arrangement for character-by-character writing into or reading out of an information track according to the second method, FIG. 5 is a block diagram of an arrangement for the block-wise read-out of an information track according to the second method, and FIG. 6 is a block diagram of an arrangement for blockwise writing on the information track according to the second method.

In both the first and second methods to be described, the timing tracks for the "drum-seam pulse" (rev. pulse), the overflow pulse, and the pulses which identify the group A and group B cell positions are common to all information tracks.

In a character-by-character transfer, each character to be written onto the drum is first transferred to the register R1. When a complete character is stored in the register a signal K is produced by a control device Z, whereby the bistable element F1 is put into position 1 via the OR-circuit V1. Since the bistable element F4 is initially in position I, the AND-circuit U1 transfers the next "seam pulse" from the combination of timing track N, reading head 11, and reading amplifier 12, to the bistable element F2 setting the latter into position 1 via the OR-circuit V2. Thereby the combined writing/reading head 13 of the information track is connected to the reading amplifier 15 via switch 14. The timing track signals A*t* and B*t* mark the first control bit position in groups A and B, respectively. Timing pulses are provided by the timing track A*t* over the reading head 16 and the reading amplifier 17 at the group A time positions, while the timing track B*t* via the reading head 18 and the reading amplifier 19 transfers timing pulses at the group B time positions.

The timing pulses, A*t* and B*t*, respectively, are applied to the AND-circuits U2 and U3, so that in response to a 1 control bit in the first control bit position of an information cell being read out by head 13, either the AND-circuit U2 or the AND-circuit U3 transfers a trigger signal to the bistable circuit F6, setting the latter either into position *a* or into position *b* respectively. The bistable element F6 therefore stores an indication that a group A or group B character is being operated upon. Furthermore, the output of AND-circuit U2 or U3 resets the bistable element F2 into the 0-position via the OR-circuit V3 and the output line 4, and thereby the magnetic head 13 of the information track I is connected to the writing generator 20. The output signal of the OR-circuit V3 is also applied to the delay circuit 02, which, after a one bit delay time, triggers the bistable element F7 into position 1, so that now the AND-circuit U4 is open. Then the character stored in the register R1, including the control character 11 in the last two digit positions, is transferred under the control of bit timing signals B*t*, through the AND-circuit U4 and the OR-circuit V4 to the writing generator 20 and from there it is written onto information track I.

When the register R1 is empty, i.e. after a complete information character and the two control bits have been transferred, the counter Z releases signal EK via means not shown, which signal passes through OR-circuit V5 resetting the bistable circuits F1 and F7 into the 0-position, and setting the bistable element F4 into position II via output line 3.

Thus the following "drum-seam pulse" passes through AND-circuit U5 setting bistable element F5 into position 1. Thereby the first input of the AND-circuit U6 is marked. The second input of U6 is then marked under the control of bistable element F6 at the first control bit interval corresponding to A*t* or B*t*, depending on the position of F6, via the AND-circuit U7 or U8, respectively, the OR-circuit and the OR-circuit V7. After a one bit delay time, delay element 03 passes a signal corresponding to the output of V6, through the AND-circuit U9 the input P1 of which is constantly marked during this transfer, to the input of AND-circuit U6 via the OR-circuit V7. Thus during both the first and second control bit intervals, AND-circuit U6 is held open and the contents of the register R2, in which the character 00 is permanently stored, are transferred to the writing generator 20 via the OR-circuit V4, so that all A or B control characters are set to 00, depending on the state of F6.

The next pulse of the timing track U, which occurs towards the end of the drum revolution, passes through AND-circuit U10, via the reading head 21 and the reading amplifier 22, the second input of U10 being marked by the 1 state output of bistable element F5. The bistable element F4 is then reset into position I via the signal on line and after a delay due to the delay element 01 the bistable element F5 is switched off (i.e. reset to the 0 state). The circuit is now in its basic or starting condition again.

After a new character is fed into register R1, the signal K is given again and the process starts all over. The transfer is terminated when no further characters are available for transfer into register R1.

For a block-wise writing on the drum, that is, to rapidly feed-in information items furnished by a data-processing system, the circuit arrangement according to FIG. 1 also applies. The only difference is that instead of the signals K and EK, the signals P3 and EP3 are emitted by means explained in connection with FIG. 6, while the signals K and EK are concurrently suppressed by means not shown. Furthermore, the signal P1 is suppressed so that during the second drum rotation only the first A or B control bits are set to 0, the AND-circuit U9 being blocked due to the suppression of signal P1. In all other details the process is the same as described above with control characters 00 being written in with the information characters during the first drum rotation, and with the end of the transfer indicated by signal EP3.

FIG. 2 schematically displays the circuit arrangement for a blockwise reading of the information track recorded by the arrangement of FIG. 1. The parts identical with those shown in FIG. 1, are marked with the same reference letters and/or ciphers. Initially, the bistable element F0 is set to position 1 by a start signal P2. The next following drum-seam pulse then tilts the bistable element F2 into position 1 via the AND-circuit U11 and thus connect the combined writing and reading head of the information track 13 to the reading amplifier 15. The following information items will be read out and forwarded to the intermediate register R1 until in coincidence with an A*t* or B*t* signal respectively, a 1 output issues from amplifier 15. When this happens, an output signal is transferred either by AND-circuit U12 or AND-circuit U13, which resets bistable elements F0 and F2 into the position 0 via the OR-circuit V8, thereby disconnecting the reading amplifier 15 from the writing/reading head, so that the block-wise reading is terminated.

FIG. 3 shows a functional block diagram of the circuit required for a character-by-character reading of the information track. This circuit contains elements which are also necessary for a character-by-character or a block-wise writing on the information track, these being marked with the same reference letters and/or ciphers as used in FIG. 1.

The information previously written in block form is to be read from the drum into the register R1, character-by-character. As soon as the register R3 is empty, signal EK is emitted, setting the bistable element F1 to the 1 state via the OR-circuit V1. At the following drum-seam pulse, the AND-circuit U1 passes a signal which connects, via the OR-circuit V2 and the bistable element F2, the reading amplifier 15 to the reading/writing head. In compliance with the present reading method the second control character bit with the marking 1 which identifies the start of the information, must now be searched for. This control marking occurs one bit timing period after the control pulses A*t* or B*t*, respectively. In order to correspondingly delay the control pulses A*t* and B*t* by one bit the delay circuits 04 and 05 are provided. If now a 1 is read on the information track at the position of the second control bit, the AND-requirements are met at the AND-circuit U14 or U15 so the bistable circuit F6 is put either into position *a* or *b*, indicating that the control bit 1 has been found at group A or group B. Furthermore, the bistable element F8 will be set to the 1 state via the OR-circuit V9, consequently enabling the AND-circuits U16 and U17. With U16 enabled, the output of amplifier 15 is transferred to the register R1. At the following control pulse B*t* or A*t*, respectively, a mark signal 5 resets bistable element F2 to 0 via the OR-circuit V10 and the enabled AND-circuit U17, consequently disconnecting the reading amplifier 15 from the information track and connecting the writing generator 20 to the combined reading/writing head. Also, after a one bit delay through delay element 06, the signal 5 resets the bistable element F8 to the 0-position. At this time both inputs of the AND-circuit U18 are marked, so that the AND-circuit U19 is open and a 1 is transferred from register R4 to the writing generator 20 via the AND-circuit U19 and the OR-circuit V4, this 1 being thus written at the second bit position of the next control character. Upon resetting of the bistable element F8 the delay element 07 will operate after a delay of one bit, to transfer a signal 7 to the bistable element F4, setting F4 to position II.

At the following seam pulse the bistable element F5 is set to 1 via the AND-circuit U5, so that now, depending on the position of the bistable element F6 at the moment A*t'* or B*t'*, respectively, the AND-requirement for the AND-circuit U20 or U21, is respectively satisfied, enabling AND-circuit U22, through the OR-circuit V11, to pass the 0 stored in the register R5 to the writing generator 20 via AND-circuit U22 and OR-circuit V4, whereby a 0 is written in the second bit positions of the A or B control characters, cancelling the 1 read during the first drum rotation.

The next following overflow pulse U puts the bistable element F4 into position I via the AND-circuit U10 and further connects the reading amplifier 15 again to the combined reading/writing head via the AND-circuit U10 and the OR-circuit V2. Furthermore, after a one bit delay through the delay circuit 01, the overflow pulse resets bistable element F5 to its 0 position.

As soon as the register R1 is emptied signalling EK the above process starts again and the next character is read. If at the moment A*t* or B*t*, respectively, a 1 control bit is read out, the bistable element F1 will be switched off via the output 6 of OR-circuit V3, and the transfer is terminated.

The second method according to the invention will now be more fully explained with reference to FIGS. 4–6 wherein circuit elements which correspond to those in FIGS. 1–3, are marked with the same reference letters and/or ciphers as in the example according to FIGS. 1–3.

As soon as a complete character has been fed into the register R1 (FIG. 4) a signal K is emitted via counter Z setting the bistable element F10 to the 1 state via the OR-circuit V12. The following drum-seam pulse passes through AND-circuit U23 and OR-circuit V13 to the bistable element F9, thereby connecting reading amplifier 15 to the combined reading/writing head 13.

If a 0 is read at the moment *At* or B*t*, respectively, the AND-requirement for the respective AND-circuit U24 or U25 is met, since bistable element F11 is in position I and the 0 transferred by the reading amplifier 15 is inverted by the inverter In. Thereby the bistable element F12 is set either into position *a* or position *b* indicating that the 0 control bit marking has been found in a group A or B cell, respectively. Furthermore, the reading amplifier is then disconnected via the OR-circuit V14, output 3 of AND-circuit U26, and OR-circuit V19, the second AND-input P1 being constantly marked during this transfer. When the amplifier 15 is disconnected, the writing generator 20 is connected to the combined reading and writing head 13. The bistable element F13 will have been put into position 1 by the above-mentioned 0 control bit, via the OR-circuit V14 and the one bit delay element 08, so the AND-circuit U27 will thereby have been opened. The information stored in the register R6 is now passed to the writing generator 20 via AND-circuit U27 and OR-circuit V15; the generator writing the information onto the information track. As soon as the register R6 is empty, that is, when a complete character has been transferred, the counter Z releases the signal EK which, via output 4 of the OR-circuit V16, resets the bistable elements F13 and F10 into their 0-positions, and sets bistable element F11 into position II.

The following "drum-seam pulse" thus passes through AND-circuit U28 setting bistable element F14 into position 1 (output 5 marked). Then depending on the position of the bistable element F12, the AND-circuit U29 or U30, respectively, will transfer a signal, at the moment A*t* or B*t*, respectively, to the output 7 of OR-circuit V17, so that now all of the three inputs of AND-circuit U31 are marked, the 1 stored in the register R7, being thus transferred to writing generator 20, and consequently, written on the information track, via the OR-circuit V15. At the first bit position of the control character at A or B, respectively, a 1 is thus entered. Also, the delay element 09 is operated by the output of AND-circuit U31, whereupon, after a delay of one bit, the output 2 is marked again connecting the reading amplifier 15 to the reading/writing head. At the next following B*t*- or A*t*-timing interval, respectively, the first bit position of the control character of the following storage cell will be read. Depending upon whether a 1 or a 0 is read in each interval, the output of AND-circuit U32 or U33 will be marked via the OR-circuit V18. If the output of AND-circuit U32 is marked then in the next following A*t*- or B*t*-timing interval a 1 must be written into the first bit position of the control character. Therefore, the writing generator 20 will again be connected to the reading/writing head 13 via the output 9 of AND-circuit U32 and V19, and after having written the 1, head 13 will be reset to reading, via the delay element 09 and V13. This is repeated until the output 6 of AND-circuit U33 is marked, i.e. until a 0 first control bit is read from the information track. Thereupon, the bistable element F11 will again be reset into position I via the output 6 of AND-circuit U33 and after a delay of one bit through the delay element 010 the bistable element F14 is switched-off. The drum then completes its second rotation.

The circuitry is again in its basic position. If a new information character has been fed into register R1, the process starts again. The transfer is terminated, if no new character is available for loading register R1.

Also for a character-by-character reading of the information previously transferred in a block write-in, the circuit arrangement in FIG. 4 is used.

It is assumed that the information to be read from the magnetic drum is stored in the register R1. As soon as the register R1 is empty, the signal EK is emitted by the counter Z setting the bistable element F10 to position 1 via the OR-circuit V12. At the next following "drum seam pulse" the AND-circuit U23 is energized connecting reading amplifier 15 to the combined reading/writing head 13. At the first 0 control marking read out at the moment A*t* or B*t* respectively, the coincidence condition of U24 and/or U25 will be met via the inverter In. As already described above, the bistable element F12, then stores an indication that the 0 was found in a group A or in a group B cell. Here too, the bistable circuit F13 will be put into position 1 after a one bit delay via the OR-circuit V14 and the delay element 08. Since the signal P3 is constantly marked during character-by-character reading, the AND-circuit U34 is open.

The information now read out of amplifier 15 is transferred to the register R1 via the AND-circuit U34 and the OR-circuit V21 the signal K being emitted by the counter Z when a complete information character is stored in R1, whereby the bistable elements F13 and F10 are switched off via the output 4 of OR-circuit V16. Simultaneously the bistable element F11 is brought into position II and the writing generator 20 is again connected to the combined reading and writing head 13; via the OR-circuit V19 and the bistable element F9.

With the following "drum-seam pulse" the output of AND-circuit U28 is marked, setting bistable element F14 to the 1 state so that the inputs 5 of AND-circuits U32 and U33 are marked. At the moment *At* or B*t*, respectively, the AND-circuit U29 or U30, respectively, is energized depending on the position of the bistable element F12, opening AND-circuit U31 via output 7 of OR-circuit V17, so that the 1 stored in the register R7 is then transferred through the AND-circuit U31, the OR-circuit V15, the writing generator 20 and the reading/writing head to the first bit position of the control character in group A or group B. Furthermore, the delay element 09 is operated again, so that after a delay of one bit, the writing generator is again disconnected and the reading amplifier is connected.

If at the following B*t*- or A*t*-timing interval a 1 is read in the first bit position of the control character all requirements for the AND-circuit U32 are met, so the head 13 will be switched over again from reading to writing, namely via the OR-circuit V19 and the bistable circuit F9. With the following A*t*- or B*t*-timing pulse, a 1 will be written at the first position of the control character and the head again switched over from writing to reading via the delay element 09 and OR-circuit V13, and at the following B*t*- or A*t*-timing pulse the first bit position of the control character will be read. If a 1 is read, the just described process is repeated.

If a 0 is read output 6 of AND-circuit U33 is energized resetting bistable element F11 to its position I and, after a delay of one bit through delay element 010, resetting bistable element F14 to 0. The circuitry is again in its original position.

If the register R1 is emptied, that means, if a complete character has been transferred from the register into the connected output device, the signal EK is emitted, whereupon the bistable element F10 is set to 1 again via the OR-circuit V12, and the above described process starts again. This is repeated until an information character is read out which only consists of 0-markings. Such a character will be interpreted by means not shown as a final character and the transfer will be terminated.

The block-wise reading of the information track will be described with reference to FIG. 5. Upon the occurrence of control pulse P2 the bistable element F10 is triggered into position 1 via the OR-circuit V12. At the following "drum-seam pulse" the reading amplifier 15 is connected to the combined reading/writing head 13 via AND-circuit U23, OR-circuit V13, and bistable element F9. Simultaneously the bistable element F15 is set to 1, opening AND-circuit U35 which forwards the information to the register R9 and from there to the data-processing system. In this register each character is tested by circuit T1 to see if it consists entirely of 0-markings. If so, the signal EP2 is emitted resetting bistable elements F10 and F15 to their 0 states, and the transfer is completed.

In a block-wise writing on the information track (FIG. 6) control pulse P3 sets bistable element F10 to the 1 state. At the following "drum-seam pulse" the reading amplifier 15 is connected to the combined reading/writing head 13 via the AND-circuit U23, the OR-circuit V13, and the bistable element F9. If a 0 control bit is read out at the moment A*t* or B*t*, respectively, the AND-circuit U36 will be energized via inverter In and OR-circuit V20, resetting F9 to the 0 state (reading to writing) and setting the bistable element F16 into position 1. Thereby the AND-circuit U37 is opened, so that the information can now be transferred to the writing generator 20 from the register R10, the generator writing it onto the information track. At the end of the information the terminating pulse EP3 is emitted from circuit T2 resetting bistable elements F10 and F16 to their 0 states, and the transfer is finished. By the circuit T2 it is subsequently tested, whether the information contains a block-end character, and if so, pulse EP3 is emitted by circuit T2.

While we have described the principles of our invention in connection with specific apparatus, it is to be clearly understood that this description is made only by way of example and not as a limitation to the scope of our invention as set forth in the accompanying claims.

What we claim is:

1. A method for effecting block-wise transfers of information items between an information track of a circulating memory and rapid data-processing systems on one hand, and for effecting character-by-character transfers between the circulating memory and slow input and output devices on the other hand, using a combined reading/writing head per track, reference being made to said rapid data-processing systems and said input and output devices as adjacent systems, and wherein the writing and reading is achieved in relation to a track space including a sufficient number of character cells to store a word, comprising the steps of assigning at least two groups (A, B), in a predetermined sequence, to successive character storage cells, then during at least one rotation of the memory performing an information transfer between the memory and at least one of said adjacent systems while varying a control character stored in each storage cell to distinguish between the block-wise and the character-by-character information transfer operation being performed, depending on the group to which the storage cell belongs, the variation of the control characters being such that the condition of the control characters after a character-by-character reading is the same as after a character-by-character writing and such that character-by-character reading is performed only on information transferred into said memory by a block-wise writing operation.

2. A method according to claim 1, in which the control character "00" is used to mark the idle storage cells and further including the steps of testing, during a first memory rotation, all first bit positions of the control characters to detect and to distinguish between a "0" and "1" and, after detection of the first "0," transfering the information between each said respective idle storage cell and the following storage cell, while simultaneously determining to which group the storage cell containing the first "0" belongs, and then during a second rotation of the memory, reading the first bit positions of all control characters of the other group and entering a "1" into the first bit position of the following control character after a "1" has been read out of the said other group in said first bit position.

3. A method according to claim 1, further characterised in that the control character "11" is used to indicate a transition between busy and idle storage cells, and further including the steps of detecting and distinguishing, in a first drum rotation occurring during a character-by-character writing operation, between a "0" and "1" in the first bit positions of the control characters, writing the information after such a "1" is found, while simultaneously noting to which group the "1" control character's storage cell belongs, then writing the control character "11" into the next idle storage cell; and for a character-by-character reading, checking all second bit positions of the control character for a "0" or "1," while simultaneously noting in which group a "1" is found, then entering a "1" at the second bit position of the following control character; and in a second drum rotation, performing the following entries of control characters depending upon the nature of the information writing operation: (a) in a character-by-character writing operation, writing "00" in all control character positions of the noted group, (b) in a character-by-character reading operation, writing a "0" at the second bit positions of all control characters of the noted group, and (c) in a block-wise writing operation, entering a "0" at the first bit positions of all control characters of the noted group, as in the character-by-character writing.

4. Apparatus for effecting block-wise transfers of information between a track of a circulating memory and high-repetition-frequency data-processing systems and for effecting character-by-character transfers of information between said track and relatively low-repetition-frequency input and output devices, comprising a single reading/writing head operatively associated with a track of a circulating memory, means for selectively transferring signals between said track and said head, means coupled to said transferring means for operating said transferring means to transfer a first predetermined control character signal received by said head from said associated track, means responsive to said first control character signal to operate said transfer means to transfer a combination of information and control character signals relative to said head, and means operative during a subsequent rotation of said circulating memory to alter said first predetermined control signal in a predetermined manner to cause said first predetermined control signal to assume an identical condition after said block-wise transfers and after said character-by-character transfers.

References Cited by the Examiner

UNITED STATES PATENTS

| | | | |
|---|---|---|---|
| 2,863,134 | 12/1958 | Buchholz et al. | 340—174.1 |
| 2,890,440 | 6/1959 | Burkhart | 340—174.1 |
| 2,923,922 | 2/1960 | Blickensderfer | 340—174.1 |
| 2,932,010 | 4/1960 | Mayer et al. | 340—174.1 |
| 2,954,166 | 9/1960 | Eckdahl et al. | 340—174.1 |
| 2,972,735 | 2/1961 | Fuller et al. | 340—174.1 |

BERNARD KONICK, *Primary Examiner*.

IRVING SRAGOW, TERRELL W. FEARS, *Examiners*.

F. C. WEISS, A. F. BERNARD, V. P. CANNEY, *Assistant Examiners*.